United States Patent
Gier et al.

(10) Patent No.: US 10,875,279 B2
(45) Date of Patent: Dec. 29, 2020

(54) METHOD FOR AUTOCLAVE-FREE LAMINATION OF A COMPOSITE PANE

(71) Applicant: SAINT-GOBAIN GLASS FRANCE, Courbevoie (FR)

(72) Inventors: Stephan Gier, Bous (DE); Stefan Luecke, Alsdorf (DE); Wojciech Kluczewski, Olkusz (PL)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 45 days.

(21) Appl. No.: 15/739,155

(22) PCT Filed: Dec. 12, 2016

(86) PCT No.: PCT/EP2016/080651
§ 371 (c)(1),
(2) Date: Dec. 21, 2017

(87) PCT Pub. No.: WO2017/102656
PCT Pub. Date: Jun. 22, 2017

(65) Prior Publication Data
US 2019/0329530 A1 Oct. 31, 2019

(30) Foreign Application Priority Data
Dec. 14, 2015 (EP) .................................... 15199718

(51) Int. Cl.
*B32B 17/10* (2006.01)

(52) U.S. Cl.
CPC .. *B32B 17/10853* (2013.01); *B32B 17/10761* (2013.01); *B32B 17/10862* (2013.01); *B32B 17/10871* (2013.01)

(58) Field of Classification Search
CPC ........ B32B 17/10853; B32B 17/10761; B32B 17/10862; B32B 17/10871; B32B 17/10844
See application file for complete search history.

(56) References Cited

U.S. PATENT DOCUMENTS 4,175,162 A * 11/1979 De Boel .............. B32B 38/0036
428/428
5,536,347 A 7/1996 Moran
(Continued)

FOREIGN PATENT DOCUMENTS

CN 101151149 A 3/2008
DE 19643404 A1 4/1998
(Continued)

OTHER PUBLICATIONS

International Search Report for International Application No. PCT/EP2016/080651 filed Dec. 12, 2016 on behalf of Saint-Gobain Glass France. dated Feb. 15, 2017. 7 pages. (German + English Translation).

(Continued)

*Primary Examiner* — Christopher T Schatz
(74) *Attorney, Agent, or Firm* — Pillsbury Winthrop Shaw Pittman LLP (57) ABSTRACT

A method for autoclave-free lamination of a composite pane. A stack sequence of a substrate pane, at least one intermediate layer, and a cover pane is produced,
a vacuum ring or a vacuum bag is placed around the stack sequence,
the stack sequence is deaerated for a period of t≥8 min and at a temperature T from 0° C. to 30° C. by application of a negative pressure of p≤0.3 bar to the vacuum ring or the vacuum bag,
the stack sequence is heated to a temperature T of 70° C. to 115° C., (Continued)

the stack sequence is deaerated for a period t of t≥8 min by application of a negative pressure of p≤0.3 bar to the vacuum ring or the vacuum bag, the stack sequence is cooled to a temperature T<70° C., the vacuum ring or the vacuum bag is aerated and removed, the stack sequence is heated to a temperature T from 40° C. to 120° C., the stack sequence is pressed together between at least two opposing calender rollers of a first calender unit over the entire width b of the stack sequence.

13 Claims, 3 Drawing Sheets (56) References Cited

U.S. PATENT DOCUMENTS

| | | |
|---|---|---|
| 5,773,102 A | 6/1998 | Rehfeld |
| 2001/0007270 A1 | 7/2001 | Balduin et al. |
| 2002/0068177 A1 | 6/2002 | Garnier et al. |
| 2003/0148114 A1 | 8/2003 | Bourcier et al. |
| 2004/0182493 A1 | 9/2004 | Chick |
| 2009/0126859 A1 | 5/2009 | Cadwallader et al. |
| 2010/0018646 A1* | 1/2010 | Metzger ............ B32B 17/10871 156/285 |

FOREIGN PATENT DOCUMENTS

| | | |
|---|---|---|
| DE | 19835496 A1 | 2/2000 |
| DE | 19903171 A1 | 8/2000 |
| EP | 0331648 A2 | 9/1989 |
| EP | 0763420 A1 | 3/1997 |
| EP | 0844075 A1 | 5/1998 |

OTHER PUBLICATIONS

Written Opinion for International Application No. PCT/EP2016/080651 filed Dec. 12, 2016 on behalf of Saint-Gobain Glass France. dated Feb. 15, 2017. 19 pages. (German + English Translation).

First Office Action as issued in Chinese Patent Application No. 201680002620.6, dated Jan. 22, 2020.

* cited by examiner a) Producing a stack sequence (1) of a substrate pane (2), at least one intermediate layer (3), and a cover pane (4)

Deaerating the stack sequence (1) by a vacuum method, preferably a vacuum ring method or a vacuum bag method:

b1) Placing a vacuum ring (6) or a vacuum bag around the stack sequence (1)

b2) (Cold deaerating:)
 Deaerating at $T \leq 30\,°C$ and $p \leq 0.2$ bar for $t \geq 8$ min.

b3) Heating the stack sequence (1) to $T = 70\,°C$ to $115\,°C$ b4) (Hot deaerating:)
 Deaerating at $p \leq 0.2$ bar for $t \geq 8$ min.

b5) Cooling to $T < 70\,°C$ b6) Aerating and removing the vacuum ring (5) or the vacuum bag Pressing the stack sequence (1) in a calender method:

c1) Heating the stack sequence (1) to $T = 40\,°C$ to $120\,°C$ c2) Pressing the stack sequence (1) between two opposing calender rollers (6.1, 6.2) on the entire surface (width) of the stack sequence (1)

*Optionally:* c3) Pressing an edge region (7) of the stack sequence (1) with at least two additional calender rollers (8.1, 8.2), wherein the width r of the edge region (7) is at least 1 cm.

METHOD FOR AUTOCLAVE-FREE LAMINATION OF A COMPOSITE PANE

CROSS-REFERENCE TO RELATED APPLICATIONS

The present application is the U.S. National Stage of International Patent Application No. PCT/EP2016/080651 filed on Dec. 12, 2016 which, in turn, claims priority to European Patent Application No. 15199718.6 filed on Dec. 14, 2015.

The invention relates to a method for autoclave-free lamination of a composite pane as well as a device for carrying out the method according to the invention.

Composite panes are widely used, for example, as vehicle panes such as windshields, side window panes, rear window panes, or roof panels in vehicles on water, on land, or in the air, but also as architectural panes, as fire-resistant panes, as safety glazing, or in furniture as well as movable or fixedly mounted fixtures.

Composite panes typically include two panes, for example, a substrate pane and a cover pane, that are bonded to one another via an intermediate layer, for example, made of a thermoplastic polyvinyl butyral (PVB) film in a lamination process under the action of heat and pressure.

Industrially customary lamination processes usually include a deaeration process combined with an autoclave process, as is disclosed, for example, in DE 19903171 A1. Autoclave processes are, generally speaking, very time consuming and energy intensive.

Autoclave-free lamination methods often have the disadvantage that the panes are only inadequately bonded to one another and, for example, in the automotive sector, do not meet customary requirements. In addition, composite panes laminated without an autoclave often have air pockets and cloudiness in the edge region of the composite pane. Consequently, special intermediate layers are frequently used in autoclave-free lamination processes.

DE 196 43 404 A1 discloses an autoclave-free method, wherein a composite pane is produced with a special plasticizer-containing, partially acetalized polyvinyl alcohol film with a very low water content of less than 0.35 wt.-%, based on the weight of the film and an effective content of an adhesion-enhancing silicon-organofunctional silane. The autoclave-free method includes a single-step vacuum method, wherein the pane is heated to temperatures of 130° C.

US 2009/0126859 A1 discloses an autoclave-free method, wherein a composite pane is produced with a special ionomeric film.

The object of the present invention now consists in providing an improved method method for autoclave-free lamination of a composite pane that enables producing high-quality composite panes economically.

The object of the present invention is accomplished according to the invention by a method for autoclave-free lamination of a composite pane according to the disclosure. Preferred embodiments emerge from the disclosure.

The method according to the invention comprises at least the following process steps:

A first step:
(a) Producing a stack sequence of a substrate pane, at least one intermediate layer, and a cover pane, which is laminated by the method according to the invention to form a composite pane.

A sequence of steps for deaerating the stack sequence, comprising the steps:

(b1) Placing a vacuum ring or a vacuum bag around the stack sequence,
(b2) Deaerating the stack sequence
at a temperature T of 0° C. to 30° C., preferably at room temperature or ambient temperature,
for a period t greater than or equal to 8 minutes (abbreviated: min), preferably a period t of 10 min to 60 min and particularly preferably for a period t of 10 min to 20 min, and
by application of an absolute pressure p less than or equal to 0.3 bar, preferably less than or equal to 0.2 bar, and particularly preferably less than or equal to 0.15 bar, to the vacuum ring or the vacuum bag,
(b3) Heating the stack sequence to a temperature T of 70° C. to 115° C., preferably of 80° C. to 100° C., at a pressure p less than or equal to 0.3 bar, preferably less than or equal to 0.2 bar, and particularly preferably less than or equal to 0.15 bar,
(b4) Deaerating the stack sequence
for a period t greater than or equal to 8 min, preferably a period t of 10 min to 60 min, and particularly preferably for a period t of 10 min to 20 min,
by application of an absolute pressure p less than or equal to 0.3 bar, preferably less than or equal to 0.2 bar, and particularly preferably less than or equal to 0.15 bar, to the vacuum ring or the vacuum bag,
(b5) Cooling the stack sequence to a temperature T of less than 70° C., and
(b6) Aerating and removing the vacuum ring or the vacuum bag.

As well as another step sequence for pressing the stack sequence together, comprising the steps:
(c1) Heating the stack sequence to a temperature T of 40° C. to 120° C., preferably of 50° C. to 110° C.,
(c2) Pressing the stack sequence together in a first calender unit between at least two opposing calender rollers over the entire width b of the stack sequence.

In the context of the present invention, "opposing" means that the two calender rollers are opposite one relative to the process plane, i.e., the position of the stack sequence during the pressing. In other words, one calender roller is arranged on one side of the process plane (for example, below the stack sequence) and the other calender roller is arranged on the other side of the process plane (for example, above the stack sequence). The calender rollers are arranged congruently relative to one another with respect to an orthogonal projection through the process plane. This means that the respective centers of the contact surfaces of the calender rollers arranged above and below the stack sequence with the respective surface of the stack sequence are arranged congruently to one another.

Here, the width b of the stack sequence is the direction perpendicular to the transport direction of the stack sequence through the calender rollers.

In an advantageous embodiment of the method according to the invention, in process step (b3), the stack sequence is heated to the target temperature within a period of 5 min to 60 min, preferably within 10 min to 35 min.

An advantageous embodiment of the method according to the invention includes a process step c3) subsequent to the process step c2), wherein an edge region of the stack sequence is pressed together in a second calender unit between at least two additional opposing calender rollers.

The width r of the edge region that is pressed together by the additional calender rollers is advantageously at least 1 cm, preferably from 1 cm to 50% of the width b of the stack sequence, and particularly preferably from 2 cm to 30% of the width b of the stack sequence. Here, the width b of the stack sequence is defined as the width orthogonal to the transport direction of the stack sequence, i.e., orthogonal to the transport direction through the device according to the invention.

This has the particular advantage that the stack sequence is mutually bonded particularly well in the edge region. Trapezoidal and/or slightly curved stack sequences in particular can have a curve deviation between the curve of the substrate pane and of the cover pane. This curve deviation is particularly great in the edge region. In trapezoidal composite panes, the curve deviation is particularly great in the edge region of the lower edge, i.e., in the edge region of the longer base of the trapezoid-shaped pane and tends toward the inclusion of air pockets or cloudiness. The additional step c3) results in a particularly intimate bond between the substrate pane and the cover pane in this critical region and, consequently, in particularly good pane quality.

In an alternative advantageous embodiment of the method according to the invention, in process step c2), the stack sequence is pressed together by one or a plurality of mutually opposing calender rollers of the first calender unit of the edge region with a higher contact pressure than in the remaining region. For this, it is necessary that the calender rollers can be subjected, individually or in groups, to different contact pressures. This also results in a particularly intimate bond between the substrate pane and the cover pane in the, as explained above, critical edge region of the composite pane and, consequently, in particularly good pane quality. Of course, this embodiment of the method according to the invention can also be followed by the process step c3) and the quality of the composite pane can thus be even further improved.

Basically, all electrically insulating substrates that are thermally and chemically stable as well as dimensionally stable under the conditions of the production and use of the composite pane according to the invention are suitable as the substrate pane and the cover pane.

The substrate pane and/or the cover pane preferably contain or are made of glass, particularly preferably flat glass, most particularly preferably float glass and, in particular, quartz glass, borosilicate glass, soda lime glass. Alternative substrate panes and/or cover panes preferably contain or are made of clear plastics, particularly preferably rigid clear plastics, and, in particular, polyethylene, polypropylene, polycarbonate, polymethylmethacrylate, polystyrene, polyamide, polyesters, polyvinylchloride, and/or mixtures thereof. Of course, one of the panes can contain or be made of glass; and the other pane, plastic. The substrate and/or the cover pane are preferably transparent, in particular for use of the pane as a windshield or rear window of a vehicle or other uses in which high light transmittance is desirable. In the context of the invention, a pane that has transmittance in the visible spectral range of more than 70% is considered "transparent". For panes that are not positioned in the traffic-relevant field of vision of the driver, for example, for roof panels, the transmittance can also be much lower, for example, greater than 5%.

The thickness of the substrate and/or the cover pane can vary widely and thus be ideally adapted to the requirements of the individual case. Preferably, standard thicknesses of 1.0 mm to 25 mm, preferably of 1.4 mm to 2.5 mm, are used for vehicle glass; and preferably of 4 mm to 25 mm, for furniture, appliances, and buildings, in particular for electrical heaters. The size of the pane can vary widely and is governed by the size of the application according to the invention. The substrate and, optionally, the cover pane have, for example, in the automotive and architectural sector, customary areas of 200 $cm^2$ up to 20 $m^2$.

The composite pane can have any three-dimensional shape. Preferably, the three-dimensional shape has no shadow zones such that it can, for example, be coated by cathodic sputtering. Preferably, the substrates are planar or slightly or greatly curved in one direction or in multiple spatial directions. Planar substrates are, in particular, used. The panes can be colorless or colored.

Substrates and/or cover panes are bonded to one another by at least one intermediate layer. The intermediate layer is preferably transparent. The intermediate layer preferably contains at least one plastic, preferably polyvinyl butyral (PVB), ethylene vinyl acetate (EVA), and/or polyethylene terephthalat (PET). The intermediate layer can also contain, for example, polyurethane (PU), polypropylene (PP), polyacrylate, polyethylene (PE), polycarbonate (PC), polymethylmethacrylate, polyvinylchloride, polyacetate resin, casting resins, acrylates, fluorinated ethylene propylenes, polyvinyl fluoride, and/or ethylene tetrafluoroethylene, or copolymers or mixtures thereof.

The intermediate layer can be implemented by one or even by a plurality of films arranged one above another, wherein the thickness of a film is preferably from 0.025 mm to 1 mm, typically 0.38 mm or 0.76 mm. In other words, the intermediate layer can in each case be constructed from one or a plurality of films. Preferably, at least three films, in particular polyvinyl butyral films, with alternatingly different plasticity or elasticity, are arranged one above another, as are known, for example, from EP 0763420 A1 or EP 0844075 A1.

The intermediate layers can preferably be thermoplastic and, after lamination, can bond the substrate, the cover pane, and possible other intermediate layers to one another.

The method according to the invention is particularly suitable for processing intermediate layers made of one or a plurality of polyvinyl butyral films. The surface of the polyvinyl butyral film can be embossed and have any desired roughness. Particularly preferred are polyvinyl butyral films with a roughness $R_z$ of 15 μm to 90 μm. Here, $R_z$ is defined as the average surface roughness, i.e., the sum of the height of the largest profile peak and the depth of the largest profile valley within a sampling length $I_r$.

In an advantageous embodiment of the method according to the invention, a polyvinyl butyral film with a water content greater than or equal to 0.35 wt.-% based on the weight of the film is used as an intermediate layer, preferably with a water content greater than or equal to 0.4 wt.-%, and particularly preferably with a water content greater than or equal to 0.45 wt.-%. The polyvinyl butyral films are, in particular, silane free.

Thus, the method according to the invention is suitable to use an industrial standard PVB film with a water content of ≥0.4 wt.-% and without special silane-containing adhesion promoters. Such films are particularly economical and easy to handle industrially. In contrast to prior art methods, with the method according to the invention, no films specially designed for the method are necessary. The method according to the invention is universally usable and can achieve particularly good results with the films indicated.

Moreover, the stack sequence only has to be heated to a maximum of 90° C. to 115° C. and not to higher temperatures, as in the prior art. The roller process according to the invention is particularly energy-saving. The method according to the invention with a combination of a comparatively cool vacuum process and a particularly energy-saving roller process requires only a little energy overall and is particularly economical.

In an advantageous embodiment, the entire production of the composite pane is carried out without an autoclave. The method according to the invention is, consequently, particularly energy-saving and economical.

In an advantageous embodiment of the method according to the invention, a negative pressure is continuously applied to the vacuum ring or the vacuum bag during the process steps (b2) through (b5). Preferably, a pressure p less than or equal to 0.3 bar is applied without interruption. This is, in particular, true with the use of a vacuum ring. For technical reasons, it can be necessary for the negative pressure line to be removed briefly, in particular, with the use of a vacuum bag. The vacuum ring and the vacuum bag have valves that maintain the vacuum in the ring or bag during disconnection of the pressure line. Disconnection can be necessary in order to transport the stack sequence, in particular from one station to the next. Due to leaks in the ring/bag-stack sequence system and due to outgassing from the stack sequence, the pressure can increase. Preferably, even during the disconnection phases, the pressure p remains less than or equal to 0.8 bar, particularly preferably less than or equal to 0.7 bar, and in particular less than or equal to 0.6 bar. It has been demonstrated that a brief disconnection and a brief pressure increase do not substantially worsen the results.

Another aspect of the invention includes a device for carrying out the method, at least comprising:
- a transport apparatus for moving the stack sequence through the device along a transport direction,
- a vacuum system with at least one vacuum ring or at least one vacuum bag for deaerating the stack sequence in the process steps b2) and b4),
- a first heating region for heating the stack sequence (1) in process step b3),
- a second heating region for heating the stack sequence in process step c1), which is arranged after the first heating region in the transport direction,
- a calender roller system that is arranged in or after the second heating region in the transport direction and includes a first calender unit with at least two opposing calender rollers, for pressing the stack sequence in process step c2).

Both the first heating region and the second heating region can be formed in each case from one region or a plurality of heating subregions arranged successively in the transport direction. Of course, the first heating region or all the first heating subregions is/are arranged in the region of the vacuum system. Moreover, of course, the second heating region or all the second heating subregions is/are arranged in the region of the calender roller system.

The heating regions can be operated by all technically reasonable heaters, for example, by one or a plurality of electrically operated radiant heaters, for example, made of quartz rods, by other suitable radiation sources, such as microwave emitters, by convection heaters, air circulation ovens, or by hot air currents.

In an advantageous embodiment of the device according to the invention, the calender roller system includes a second calender unit for pressing the stack sequence in process step c3), wherein the second calender unit is arranged after the first calender unit in the transport direction of the stack sequence and has at least two opposing calender rollers.

In an advantageous embodiment of the device according to the invention, the stack sequence is more strongly pressed together in an edge region than in the remaining region. The remaining region is the region between the edge regions. In an advantageous device according to the invention, the calender rollers of the first calender unit are implemented such that the stack sequence can be pressed together with a higher contact pressure in an edge region than in the remaining central region. For this, individual calender rollers or even relatively large sections of calender rollers can exert higher pressures on certain regions of the stack sequence, for example, by means of hydraulic control.

In another advantageous device according to the invention, the calender rollers of the second calender unit are implemented such that the stack sequence can be pressed together with a higher contact pressure in an edge region than in the remaining, central region.

In another advantageous device according to the invention, the calender rollers of the second calender unit are arranged only in a region in which the edge region of the stack sequence is guided through the second calender unit.

Of course, a device with increased contact pressure of the first calender unit in the edge region of the stack sequence can also be combined with a second calender unit according to the invention.

An advantageous embodiment of the device according to the invention has at least one cooling unit, preferably a fan with or without a heat exchanger. The cooling unit is arranged between the first heating region and the second heating region in the transport direction. This has the particular advantage that in process step b4), the stack sequence can be quickly cooled to the required temperature, resulting in a shortening of the process time.

In an advantageous embodiment of the device according to the invention, the calender roller has a circular core, preferably made of a hollow profile, particularly preferably with spokes or support struts, or a solid profile. The core preferably contains or is made of a metal such as aluminum or stainless steel.

The core preferably has a diameter of 5 cm to 30 cm. In an advantageous embodiment, the opposing calender rollers have cores with different diameters. Thus, the diameters of the cores arranged on one side relative to the stack sequence are from 5 cm to 10 cm, and the diameters of the cores arranged on the opposite side relative to the stack sequence are from 12 cm to 30 cm.

At least one elastomer coating is arranged on the roller shell of the core. The elastomer coating preferably has a constant layer thickness, particularly preferably a layer thickness of 5 mm to 30 mm, in particular of 10 mm to 25 mm.

The calender roller preferably has a width of 0.9 cm to 20 cm, preferably of 1.8 cm to 5 cm. The elastomer coating is preferably arranged shell-like on the entire width of the calender roller. However, the elastomer coating can also be made of two or more shell regions with a correspondingly smaller width that are arranged ring-like around the core. This is particularly advantageous for distributing the contact pressure uniformly even on curved stack sequences.

The elastomer coating according to the invention advantageously has a Shore A hardness of 40 to 90 per DIN EN ISO 868 and DIN ISO 7619-1. Such elastomer coatings are particularly suited to ensure good transfer of force from the calender roller to the surface of the stack sequence without damaging the panes of the stack sequence due to localized force peaks.

Such calender rollers of the first calender unit are preferably pressed on the surface of the stack sequence with a contact pressure of 100 N to 1000 N, preferably of 200 N to 950 N.

Such calender rollers of the second calender unit are preferably pressed on the surface of the stack sequence with a contact pressure of 50 N to 1000 N, particularly preferably of 100 N to 700 N.

Another aspect of the invention includes the use of the method according to the invention for producing a composite pane for transportation means for travel on land, in the air, or on water, in particular in motor vehicles, trains, aircraft, or watercraft, for example, as a windshield, rear window, side window pane, and/or roof panel, for buildings, in particular in the access area, window area, roof area, or façade area, as a built-in component in furniture and appliances.

In the following, the invention is explained in detail with reference to drawings and exemplary embodiments. The drawings are schematic representations and not true to scale. The drawings in no way restrict the invention.

Figure 1:
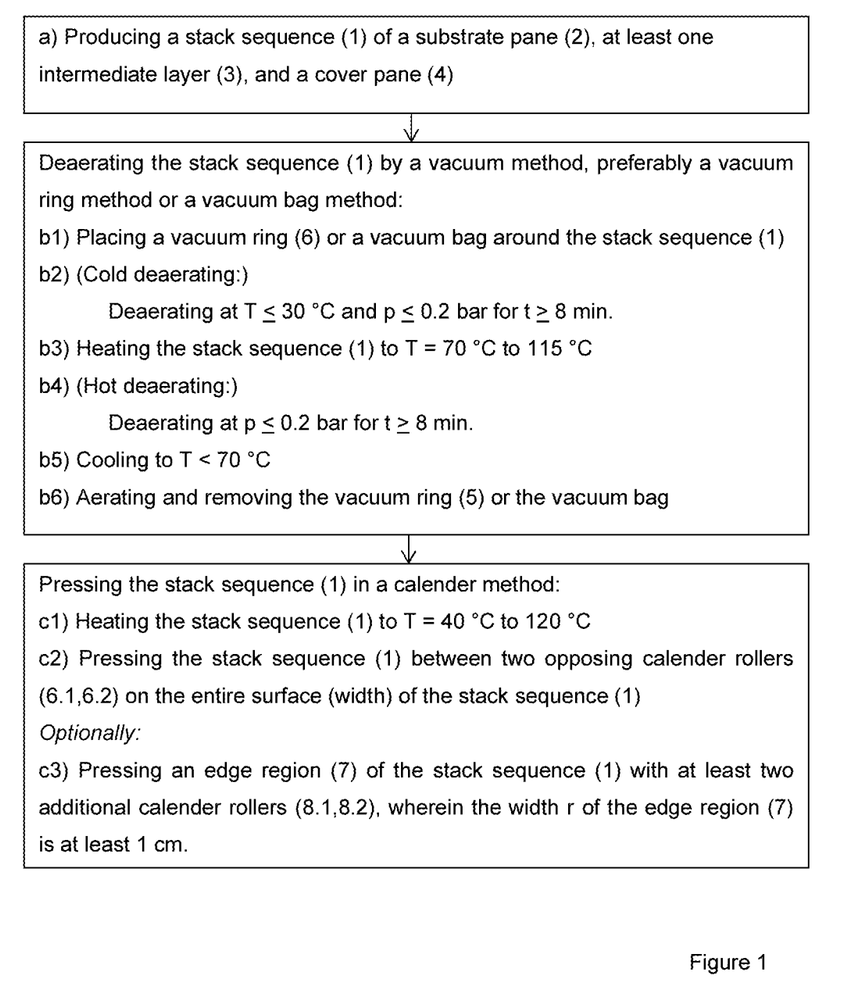
FIG. 1 a flowchart of an embodiment of the method according to the invention.

They depict:

FIG. 1 depicts a flowchart of an exemplary embodiment of the method according to the invention for autoclave-free lamination of a composite pane.

Figure 2A:
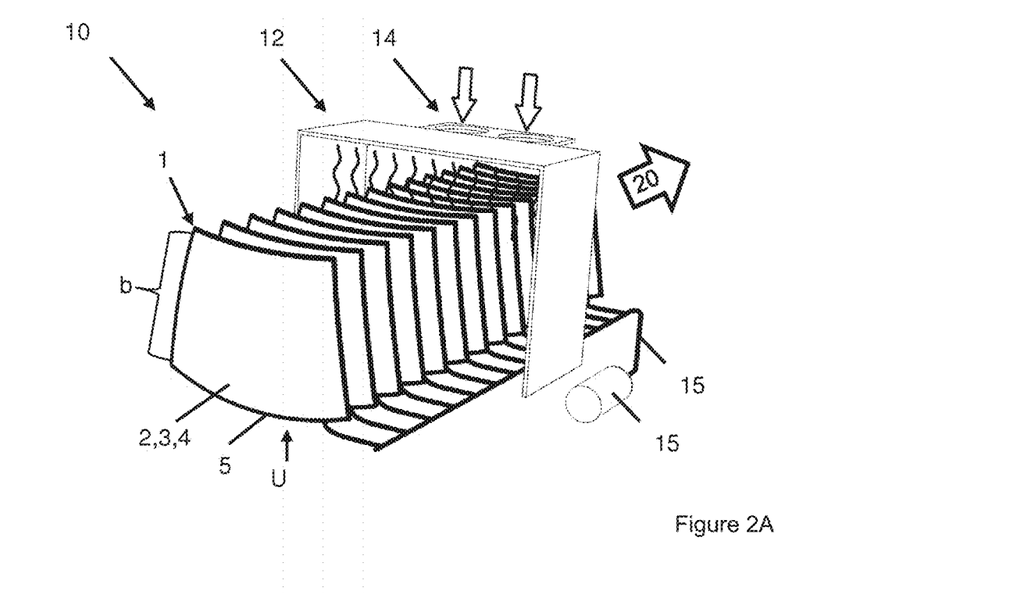
FIG. 2A a perspective view of a detail of the device according to the invention, FIG. 2B a perspective view of another detail of the device according to the invention, and FIG. 3 example of a temperature progression chart.
Figure 2B:
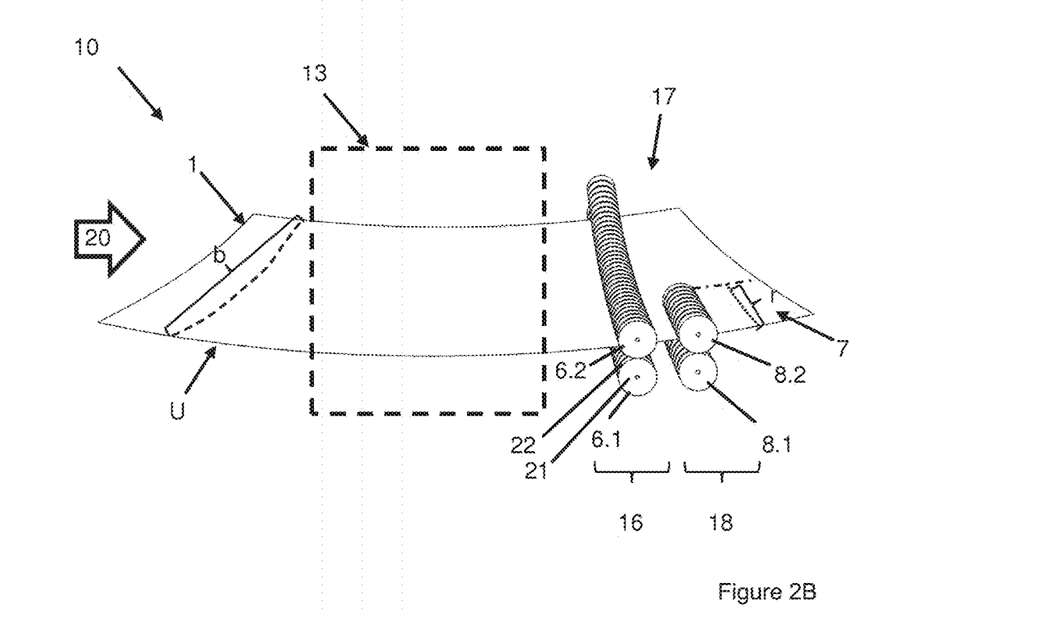

FIG. 2A and FIG. 2B depict in each case a perspective view of a detail of the device 10 according to the invention for carrying out the method according to the invention. The parts of the device 10 according to the detail of FIG. 2B are arranged, viewed in the transport direction 20, behind the parts of the device 10 according to the detail of FIG. 2A.

In a first step a) of the method according to the invention, a stack sequence 1 composed of, for example, a substrate pane 2, an intermediate layer 3, and a cover pane 4 is produced. The composite pane to be produced from the stack sequence 1 by autoclave-free lamination is, for example, a windshield of a passenger car.

The substrate pane 2 and the cover pane 4 are, in this example, in each case approx. trapezoidal and have a slight curvature, as is customary for modern windshields. The substrate pane 2 and the cover pane 4 are, in this example, the same size and are arranged congruently one above the other. The substrate pane 2 and the cover pane 4 have a width of, for example, 0.9 m and a length on the lower edge U, in other words, on the longer base of the trapezoidal panes, of, for example, 1.5 m. The edge opposite the lower edge U has a length of, for example, 1.2 m. Of course, in the lamination of composite panes of, for example, side window panes or roof panels, smaller or larger substrate panes 2 and cover panes 4, as well as triangular panes with complex convexities or rectangular panes can be used.

The substrate pane 2 is, for example, intended, in the installed position, to face the interior of the vehicle, whereas the cover pane 4 is intended to face outward relative to the vehicle interior. Substrate pane 2 and cover pane 4 are made, for example, of soda lime glass. The thickness of the substrate pane 2 is, for example, 1.6 mm; and the thickness of the cover pane 4 is 2.1 mm. Of course, the substrate pane 2 and the cover pane 4 can, for example, also be implemented with equal thicknesses. The intermediate layer 3 is a thermoplastic intermediate layer and is made, for example, of polyvinyl butyral (PVB). It has, for example, a thickness of 0.76 mm to 0.86 mm.

In a step b1) of the method according to the invention, a vacuum ring 5 is placed around the the outer side edges of the stack sequence 1. The vacuum ring 5 ("green snake") is made of a negative-pressure-stable tube that has the shape of a closed ring and has a slit on its inner side, into which the outer side edge of the stack sequence 1 is inserted. The vacuum ring 5 completely surrounds the side edges and the intermediate space between the substrate pane 2 and the cover pane 4 and seals it under vacuum conditions. The vacuum ring 5 is connected via a negative pressure tube to an optional vacuum compensation tank and a vacuum pump. The vacuum ring 5, negative pressure tube, optional vacuum compensation tank, and vacuum pump form a vacuum system 15. The vacuum compensation tank has, for example, a volume of 1 m$^3$. The vacuum pump has, for example, a pumping capacity of 300 m$^3$/h and achieves a maximum final pressure of 0.1 mbar.

FIG. 2A represents a plurality of such stack sequences 1 of, in each case, a substrate pane 2, an intermediate layer 3, and a cover layer 4 with, in each case, a mounted vacuum ring 5. The stack sequences are arranged in an upright position and parallel to one another. The stack sequences 1 are inserted into a transport apparatus (not shown), which transports the stack sequences 1 through the device along the transport direction 20. The transport apparatus is, for example, a conveyor belt with suitable holders to accommodate the stack sequences 1. The vacuum ring 5 and the negative pressure tube, which connects the vacuum ring 5 to the vacuum pump, are movably implemented such that they can be transported through the device 10 with the stack sequence 1 while maintaining the negative pressure.

In another step b2), the stack sequence 1 is deaerated by application of a negative pressure of, for example, p=0.1 bar. The pressure data are based on the absolute pressure, i.e., the pressure relative to the absolute vacuum at p=0 bar. The deaeration in this process step is done at a temperature T of the stack sequence 1 between 0° C. and 30° C. and, for example, the room temperature (RT) of the surroundings. This is done for a period t greater than or equal to 8 min and, for example, 12 min.

Figure 3:
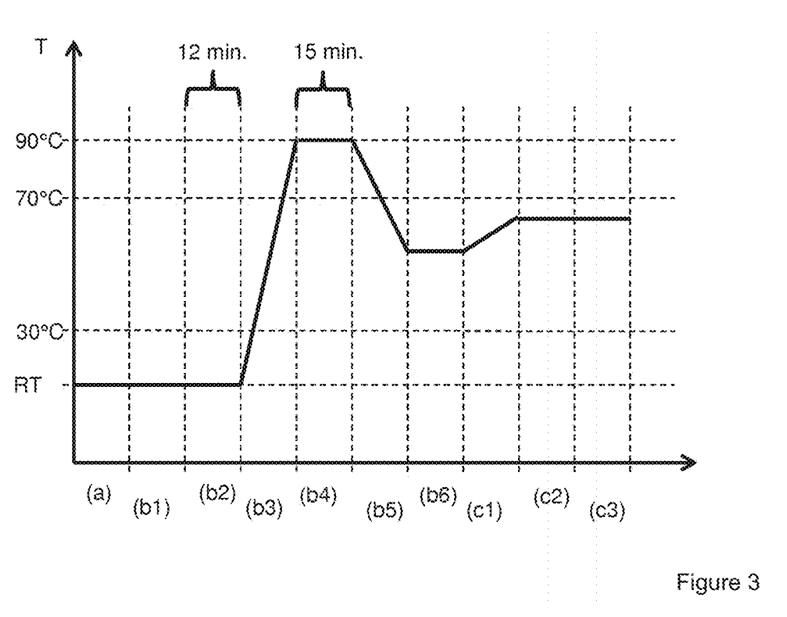

FIG. 3 depicts an exemplary diagram of the temperature progression during the method according to the invention. The horizontal axis is divided into process steps. The two axes are not true to scale.

Then, in a step b3), the stack sequence 1 is transported by the transport apparatus into the first heating region 12 of the device 10. The first heating region 12 is, for example, an air circulation oven, in which the stack sequence 1 is heated by a hot air current. There, the stack sequence 1 is heated to a temperature T of 70° C. to 115° C. and, for example, to 90° C. The negative pressure of p=0.1 bar on the vacuum ring is continuously maintained. Of course, the negative pressure can also be applied only periodically. This is, in particular, the case with the use of a vacuum bag method, wherein the vacuum bag is disconnected from the vacuum system during transport between multiple positions.

Then, in a einem step b4), the stack sequence 1 is deaerated at the temperature T of, for example, 90° C. for a period t greater than or equal to 8 min and, for example, 15 min. The negative pressure of p=0.1 bar on the vacuum ring is maintained continuously.

Then, in a step b5), the stack sequence 1 is cooled to a temperature T of less than 70° C., for example, to a temperature T of 50° C. The negative pressure of p=0.1 bar on the vacuum ring is maintained continuously. The cooling can be accelerated by a cooling unit 14, for example, by a current of air from the surroundings of the device 10 with a fan.

Cooling under negative pressure is advantageous since cooling without negative pressure results in formation of air pockets and cloudiness in the later composite pane.

Then, in a step b6), the suction on the vacuum ring 5 of the stack sequence 1 is turned off and ambient pressure is applied, by which means the vacuum ring 5 is aerated. Then, the vacuum ring 5 is removed from the stack sequence 1.

Then, the stack sequence 1 in this example is transferred from the vertical position into a horizontal position, for example, by an industrial robot.

FIG. 2B depicts a schematic view of the stack sequence 1, of the second heating region 13, and of the calender roller system 17. Here, the stack sequence 1 is lying horizontally and arranged in the longitudinal direction, in other words, the lower edge U is aligned approx. parallel to the transport direction 20.

In a step c1), the stack sequence 1 is transported by the transport apparatus into the second heating region 13 of the device 10. The second heating region 13 is, for example, an oven, which is operated by a plurality of electrically powered radiant heaters made of quartz rods. There, the stack sequence 1 is heated to a temperature T of 40° C. to 120° C. and, for example, to 60° C.

Then, the stack sequence 1 is introduced into the calender system 17. The calender system 17 consists of at least one first calender unit 16. The first calender unit 16 includes at least two opposing calender rollers 6.1,6.2. In the example shown, the first calender unit 16 includes 35 lower calender rollers 6.1 and 35 upper calender rollers 6.2, which are, in each case, arranged opposite one another. The stack sequence 1 is introduced between the lower calender rollers 6.1 and the upper calender rollers 6.2 and pressed together by them.

The calender rollers 6.1,6.2 have, in each case, a core made of a solid profile, which is made of aluminum. The core of the lower calender rollers 6.1 has a diameter of, for example, 16 cm; the core of the upper calender rollers 6.2 has a diameter of, for example, 9 cm. The shell surfaces of the calender rollers 6.1,6.2 have, in each case, for example, a 2-cm-thick elastomer coating 22 with a Shore A hardness of, for example, 70. The width of the calender rollers 6.1,6.2 is, for example, 2.6 cm. The calender rollers 6.1,6.2 have the elastomer coating 22 on their entire width, with the elastomer coating 22 having, for example, in the center of its width direction, an annular slit with a width of, for example, 0.2 cm such that the width of the contact surface of the elastomer coating 22 with the stack sequence 1 is 2×1.2 cm.

In the example shown, every fifth lower calender roller 6.1 has a drive, which continues to move the stack sequence 1 at the speed of the transport unit. Of course, even more or fewer calender rollers 6.1 or 6.2 and, in particular, all calender rollers 6.1,6.2 can have a drive. The other lower calender rollers 6.1 and the upper calender rollers 6.2 are rotatably arranged around their central axis and rotate according to the movement of the stack sequence 1.

Advantageously, each calender roller 6.1,6.2 of the first calender unit 16 is connected to a compressed air cylinder, with which pressure can be exerted on the stack sequence 1 via the calender rollers 6.1,6.2. The operating pressure of the compressed air cylinders is, for example, from 2 bar to 8 bar. The contact pressure of the calender rollers 6.1,6.2 on the surface of the stack sequence 1 is, for example, from 200 N to 950 N.

Already, with such a device, it was possible to produce composite panes with excellent quality, with no autoclave and, consequently, with energy savings and a short process time.

In an advantageous embodiment of the device according to the invention, the compressed air cylinders can be subjected individually or adjacent units composed of compressed air cylinders can be subjected individually to different pressures. Thus, it is possible, for example, to exert a higher contact pressure on the stack sequence 1 in an edge region r of the stack sequence 1 than, for example, in adjacent regions of the stack sequence 1. This embodiment has the advantage of improved quality of the edge region of the composite pane produced by the method according to the invention.

The calender system 17 depicted in FIG. 2B has a second calender unit 18, which is arranged after the first calender unit 16 in the transport direction 20. The second calender unit 18 consists, for example, of nine calender roller pairs 8.1,8.2 wherein, in each case, a lower calender roller 8.1 is arranged opposite an upper calender roller 8.2.

The calender rollers 8.1,8.2 are, for example, constructed corresponding to the calender rollers 6.1,6.2. In other words, the calender rollers 8.1,8.2 have, for example, in each case, a core 21 made of a solid profile, which is made of aluminum. The core 21 of the lower calender rollers 8.1 has a diameter of, for example, 16 cm; the core of the upper calender rollers 8.2 has a diameter of, for example, 9 cm. the shell surfaces of the calender rollers 8.1,8.2 have, in each case, for example, a 2-cm-thick elastomer coating 22 with a Shore A hardness of, for example, 70. The width of the calender rollers 8.1,8.2 is, for example, 2.6 cm. The calender rollers 8.1,8.2 have, on their entire width, the elastomer coating 22, with the elastomer coating 22 having, for example, in the center of its width direction, an annular slit with a width of, for example, 0.2 cm such that the width of the contact surface of the elastomer coating 22 with the stack sequence 1 is two times 1.2 cm.

Advantageously, each calender roller 8.1,8.2 of the second calender unit 18 is connected to a compressed air cylinder, with which pressure can be exerted on the stack sequence 1 via the calender rollers 8.1,8.2. The operating pressure of the compressed air cylinders is, for example, from 1 bar to 6 bar. The contact pressure of the calender rollers 8.1,8.2 on the surface of the stack sequence 1 is, for example, from 50 N to 700 N.

In an advantageous embodiment of the method according to the invention, the stack sequence 1, after being pressed together by the first calender unit 16 over its entire area in process step c2), is introduced in another process step c3) between the calender rollers 8.1,8.2 of the second calender unit 18. The second calender unit 18 now presses a targeted edge region 7 of the width r of, for example, 20 cm along the lower edge of the stack sequence 1 together. The edge region 7 along the lower edge of the stack sequence 1 or the composite pane formed thereby often has, in prior art methods, cloudiness and air pockets. By means of the process step c3), these air pockets and cloudiness can be effectively eliminated.

This was unexpected and surprising for the inventors.

Another aspect of the invention includes a method for autoclave-free lamination of a composite pane, wherein (a) a stack sequence (1) of a substrate pane (2), at least one intermediate layer (3), and a cover pane (4) is produced, (b1) a vacuum ring (5) or a vacuum bag is placed around the stack sequence (1), (b2) the stack sequence (1) is deaerated for a period t greater than or equal to 8 min and at a temperature T from 0° C. to 30° C. by application of a negative pressure p less than or equal to 0.3 bar to the vacuum ring (5) or the vacuum bag,
(b3) the stack sequence (1) is heated at a negative pressure p less than or equal to 0.3 bar to a temperature T from 70° C. to 115° C.,
(b4) the stack sequence (1) is deaerated for a period t greater than or equal to 8 min by application of a negative pressure p less than or equal to 0.3 bar to the vacuum ring (5) or the vacuum bag,
(b5) the stack sequence (1) is cooled to a temperature T of less than 70° C.,
(b6) the vacuum ring (5) or the vacuum bag is aerated and is removed,
(c1) the stack sequence (1) is heated to a temperature T from 40° C. to 120° C.,
(c2) the stack sequence (1) is pressed together between at least two opposing calender rollers (6.1,6.2) of a first calender unit (16) over the entire width b of the stack sequence (1).

Another aspect of the invention includes a method for autoclave-free lamination of a composite pane, wherein
(a) a stack sequence (1) of a substrate pane (2), at least one intermediate layer (3), and a cover pane (4) is produced,
(b1) a vacuum ring (5) or a vacuum bag is placed around the stack sequence (1),
(b2) the stack sequence (1) is deaerated for a period t greater than or equal to 8 min and at a temperature T from 0° C. to 30° C. by application of a negative pressure p less than or equal to 0.3 bar to the vacuum ring (5) or the vacuum bag,
(b3) the stack sequence (1) is heated at negative pressure p less than or equal to 0.3 bar to a temperature T from 70° C. to 115° C.,
(b4) the stack sequence (1) is deaerated for a period t greater than or equal to 8 min by application of a negative pressure p less than or equal to 0.3 bar to the vacuum ring (5) or the vacuum bag,
(b5) the stack sequence (1) is cooled to a temperature T of less than 70° C.,
(b6) the vacuum ring (5) or the vacuum bag is aerated and is removed,
(c1) the stack sequence (1) is heated to a temperature T from 40° C. to 120° C.,
(c2) the stack sequence (1) is pressed together between at least two opposing calender rollers (6.1,6.2) of a first calender unit (16) over the entire width b of the stack sequence (1), and the calender rollers (6.1,6.2) of the first calender unit (16) press the stack sequence (1) together in an edge region (7) with a higher contact pressure than in the remaining region.

Another aspect of the invention includes a method for autoclave-free lamination of a composite pane, wherein
(a) a stack sequence (1) of a substrate pane (2), at least one intermediate layer (3), and a cover pane (4) is produced,
(b1) a vacuum ring (5) or a vacuum bag is placed around the stack sequence (1),
(b2) the stack sequence (1) is deaerated for a period t greater than or equal to 8 min and at a temperature T from 0° C. to 30° C. by application of a negative pressure p less than or equal to 0.3 bar to the vacuum ring (5) or the vacuum bag,
(b3) the stack sequence (1) is heated at negative pressure p less than or equal to 0.3 bar to a temperature T from 70° C. to 115° C.,
(b4) the stack sequence (1) is deaerated for a period t greater than or equal to 8 min by application of a negative pressure p less than or equal to 0.3 bar to the vacuum ring (5) or the vacuum bag,
(b5) the stack sequence (1) is cooled to a temperature T of less than 70° C.,
(b6) the vacuum ring (5) or the vacuum bag is aerated and is removed,
(c1) the stack sequence (1) is heated to a temperature T of 40° C. to 120° C.,
(c2) the stack sequence (1) is pressed together between at least two opposing calender rollers (6.1,6.2) of a first calender unit (16) over the entire width b of the stack sequence (1), and
(c3) an edge region (7) of the stack sequence (1) is pressed together between at least two additional opposing calender rollers (8.1,8.2) of a second calender unit (18).

LIST OF REFERENCE CHARACTERS 1 stack sequence
2 substrate pane
3 intermediate layer
4 cover pane
5 vacuum ring
6.1,6.2 calender roller
7 edge region
8.1,8.2 calender roller
10 device
12 first heating region
13 second heating region
14 cooling unit
15 vacuum system
16 first calender unit
17 calender roller system
18 second calender unit
20 transport direction
21 core
22 elastomer coating
b width of the stack sequence 1
r width of the edge region 7
U lower edge of the stack sequence 1

The invention claimed is:
1. A method for autoclave-free lamination of a composite pane, comprising:
producing a stack sequence of a substrate pane, at least one intermediate layer, and a cover pane,
placing a vacuum ring or a vacuum bag around the stack sequence,
a first dearating process, deaerating the stack sequence for a period greater than or equal to 8 min and at a temperature from 0° C. to 30° C. by application of a negative pressure less than or equal to 0.3 bar to the vacuum ring or the vacuum bag,
a first heating process, heating the stack sequence at a negative pressure less than or equal to 0.3 bar to a temperature from 70° C. to 115° C.,
a second dearating process, deaerating the stack sequence for a period greater than or equal to 8 min by application of a negative pressure less than or equal to 0.3 bar to the vacuum ring or the vacuum bag,
cooling the stack sequence to a temperature of less than 70° C.,
aerating and removing the vacuum ring or the vacuum bag,
a second heating process, heating the stack sequence to a temperature from 40° C. to 120° C., pressing the stack sequence together between at least two opposing calender rollers of a first calender unit over an entire width of the stack sequence, wherein the calender rollers of the first calender unit press the stack sequence together in an edge region with a higher contact pressure than in a remaining region, and/or in a subsequent process step, an edge region of the stack sequence is pressed together between at least two additional opposing calender rollers of a second calender unit.

2. The method according to claim 1, wherein the edge region has a width of at least 1 cm.

3. The method according to claim 1, wherein a polyvinyl butyral film with a water content greater than or equal to 0.35 wt.-%, based on the weight of the film, and/or a silane-free polyvinyl butyral film is used as the at least one intermediate layer.

4. The method according to claim 1, wherein at least one film made of polyvinyl butyral (PVB) is used as the at least one intermediate layer.

5. The method according to claim 1, wherein glass or polymers are used for the substrate pane and/or the cover pane.

6. The method according to claim 1, wherein the contact pressure of the calender rollers of the first calender unit on the surface of the stack sequence is from 100 N to 1000 N and/or wherein the contact pressure of the calender rollers of the second calender unit on the surface of the stack sequence is from 50 N to 1000 N.

7. The method according to claim 1, wherein an entire production of the composite pane is carried out with no autoclave.

8. The method according to claim 1, wherein the edge region has a width from 2 cm to 30% of the width of the stack sequence.

9. The method according to claim 3, wherein the water content is greater than or equal to 0.4 wt.-%, based on the weight of the film.

10. The method according to claim 1, wherein at least three films made of polyvinyl butyral with alternatingly different plasticity or elasticity arranged one above another is used as the at least one intermediate layer.

11. The method according to claim 1, wherein the substrate pane and/or cover pane is selected from the group consisting of: flat glass, float glass, soda lime glass, quartz glass, or borosilicate glass.

12. The method according to claim 1, wherein the substrate pane and/or cover pane is selected from the group consisting of: polyethylene, polypropylene, polycarbonate, polymethylmethacrylate, and/or mixtures thereof.

13. The method according to claim 1, wherein the contact pressure of the calender rollers of the first calender unit on a surface of the stack sequence is from 200 N to 950 N and/or wherein the contact pressure of the calender rollers of the second calender unit on the surface of the stack sequence is 100 N to 700 N.

* * * * *